(12) United States Patent
Ashby

(10) Patent No.: US 7,238,334 B2
(45) Date of Patent: Jul. 3, 2007

(54) SYNTHESIS AND USE OF HYPOTHIOCYANITE

(75) Inventor: Michael T. Ashby, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 27 days.

(21) Appl. No.: 11/181,400

(22) Filed: Jul. 14, 2005

(65) Prior Publication Data

US 2006/0018817 A1    Jan. 26, 2006

Related U.S. Application Data

(60) Provisional application No. 60/588,294, filed on Jul. 15, 2004.

(51) Int. Cl.
*C01B 21/082* (2006.01)
*C01B 21/083* (2006.01)

(52) U.S. Cl. .................. 423/365; 423/366
(58) Field of Classification Search ........... 423/365, 423/366
See application file for complete search history.

(56) References Cited

U.S. PATENT DOCUMENTS

| | | | |
|---|---|---|---|
| 4,564,519 A | 1/1986 | Pellico et al. |
| 4,578,265 A | 3/1986 | Pellico et al. |
| 5,043,176 A | 8/1991 | Bycroft et al. |
| 5,176,899 A | 1/1993 | Montgomery |
| 5,250,299 A | 10/1993 | Good et al. |
| 5,262,151 A | 11/1993 | Montgomery |
| 5,270,033 A | 12/1993 | Montgomery |
| 5,310,541 A | 5/1994 | Montgomery |

OTHER PUBLICATIONS

Ashby et al., "Reactive Sulfur Species: Aqueous Chemistry of Sulfenyl Thiocyanates," Journal of American Chemical Society, 2004, pp. 10216-10217, vol. 126, No. 33, no month.

Ashby et al., "Redox Buffering of Hypochlorous Acid by Thiocyanate in Physiologic Fluids," Journal of American Chemical Society, 2004, pp. 15976-15977, vol. 126, No. 49, Dec. 15, 2004.

*Primary Examiner*—Wayne A. Langel
(74) *Attorney, Agent, or Firm*—Dunlap, Codding & Rogers, P.C.

(57) ABSTRACT

A method of producing hypothiocyanite by combining a hypohalous acid and thiocyanate.

4 Claims, 5 Drawing Sheets

SYNTHESIS AND USE OF HYPOTHIOCYANITE

CROSS-REFERENCE TO RELATED APPLICATIONS

The present application claims benefit of U.S. Provisional 60/588,294, filed Jul. 15, 2004, the entirety of which is expressly incorporated by reference herein.

BACKGROUND

There has been an alarming rise in the occurrence of disease-causing microbes that have become resistant to drug therapy. This antibiotic resistance is largely due to increased use of antibiotics and the remarkable resiliency of pathogenic organisms that have developed ways to survive the drugs that are meant to target them. Pneumonia, tuberculosis, malaria, and ear infections are just a few of the diseases that have become difficult to treat with our current arsenal of antibiotic drugs. All FDA-approved antibiotics that are currently in use are organic molecules. The principal endogenous non-immunological anti-microbial agent in the secretions of human exocrine glands such as saliva, tears, and milk is an inorganic electrophilic thiocyanating agent commonly referred to as "hypothiocyanite" ($OSCN^-$).

There is an enzymic method for synthesizing hypothiocyanite, and there are some products on the market that are based upon this technology. The only conventional chemical method for synthesizing hypothiocyanite is based upon the synthesis of thiocyanogen in halogenated hydrocarbon solvents using salts of lead (reagents that are highly toxic and/or carcinogenic).

Hypothiocyanite is synthesized in vivo by oxidation of thiocyanate ($SCN^-$) by hydrogen peroxide ($H_2O_2$) in a reaction that is catalyzed by peroxidase enzymes (including LPO, MPO, EPO, and SPO). However, these enzymes are not effective catalysts under the conditions that hypothiocyanite is relatively stable (above pH=8). The use of uncatalyzed oxidants, according to the literature, do not oxidize thiocyanate to give hypothiocyanite. The only non-enzymatic method of synthesizing hypothiocyanite in the literature involves hydrolysis of thiocyanogen, a compound that is typically prepared in an expensive process that involves metathesis of the toxic heavy-metal salt $Pb(SCN)_2$ with $Br_2$ in the carcinogenic solvent carbon tetrachloride. It would be desirable to have a method of hypothiocyanite production which did not involve complex enzymatic steps or the use of toxic heavy metal salts. It is to such a process that the present invention is directed.

DESCRIPTION OF THE INVENTION

The present invention contemplates a method which eliminates the requirement of expensive and/or toxic reagents and catalysts in the synthesis of hypothiocyanite. Further, in contrast to the enzymic method, the present procedure is carried out under conditions in which hypothiocyanite is relatively stable.

Since hypothiocyanite is a natural anti-microbial agent, solutions of hypothiocyanite (synthesized for example from house-hold bleach and thiocyanate) can be used in place of bleach for some disinfection applications.

Chlorine is one of the most effective disinfectants available, and hypochlorite (i.e., $OCl^-$, house-hold bleach) is a cheap, relatively safe form of chlorine that is commonly in use. House-hold bleach has a characteristically caustic odor produced by free hypochlorous acid which is considered to be the germicidally active form of chlorine. A practical disadvantage of sodium hypochlorite (NaOCl) is the risk of corrosion to most common metals (especially aluminum and galvanized iron). Potentially toxic chlorine gas is released when solutions of hypochlorite are mixed with other cleaning agents that acidify the solution. Given the significantly lower oxidation potential of hypothiocyanite as compared with hypochlorite and the fact that toxic gases analogous to chlorine are not produced upon acidification of hypothiocyanite, solutions of hypothiocyanite at stable pHs are expected to have distinct advantages over bleach for some disinfectant applications.

We have observed that that oxidation of thiocyanate ($SCN^-$) by hypochlorous acid (HOCl) to give hypothiocyanite ($OSCN^-$) is nearly diffusion-controlled:

(1)

(2)

Figure 1:
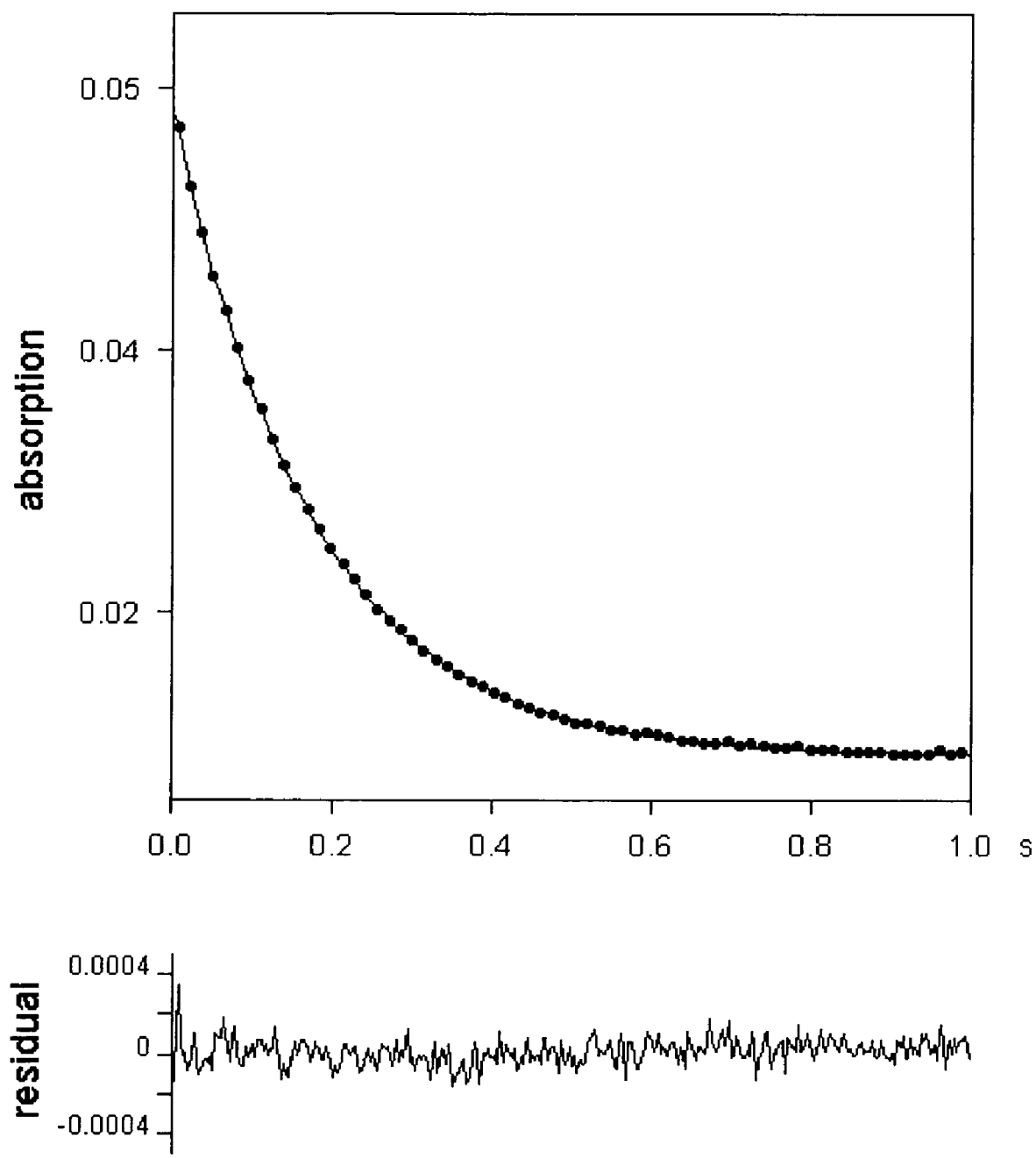
FIG. 1 is a graph showing a typical trace at 300 nm (illustrating 20% of the data) reflecting the disappearance of $OCl^-$ for the reaction of 100 μM NaOCl with 1 mM NaSCN ($[OH^-]=1.6\times10^{-2}$, pH=12, μ=1) fit to a first-order equation and residual.
Figure 2:
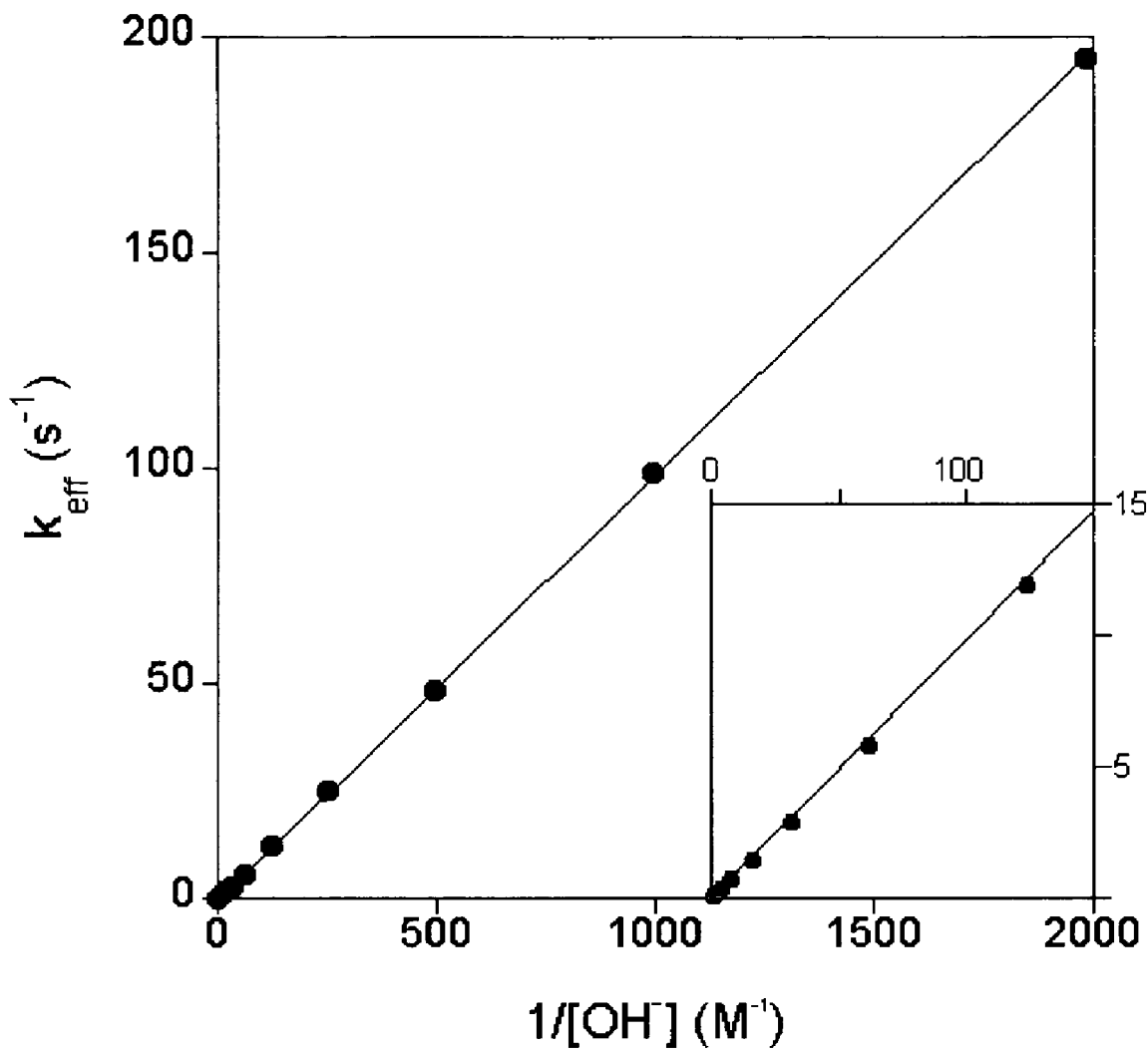
FIG. 2 is a plot of $k_{eff}$ ($[SCN^-]_0$=10 mM, $[OCl^-]_0$=0.1 mM, μ=1 mM, μ=1) as a function of $[OH^-]^{-1}$ illustrating first-order dependence. The data are fit to the linear function: $k_{eff}=(9.85\times10^{-2} Ms^{-1})/[OH^-]+1.27\times10^{-2} s^{-1}$.
Figure 3:
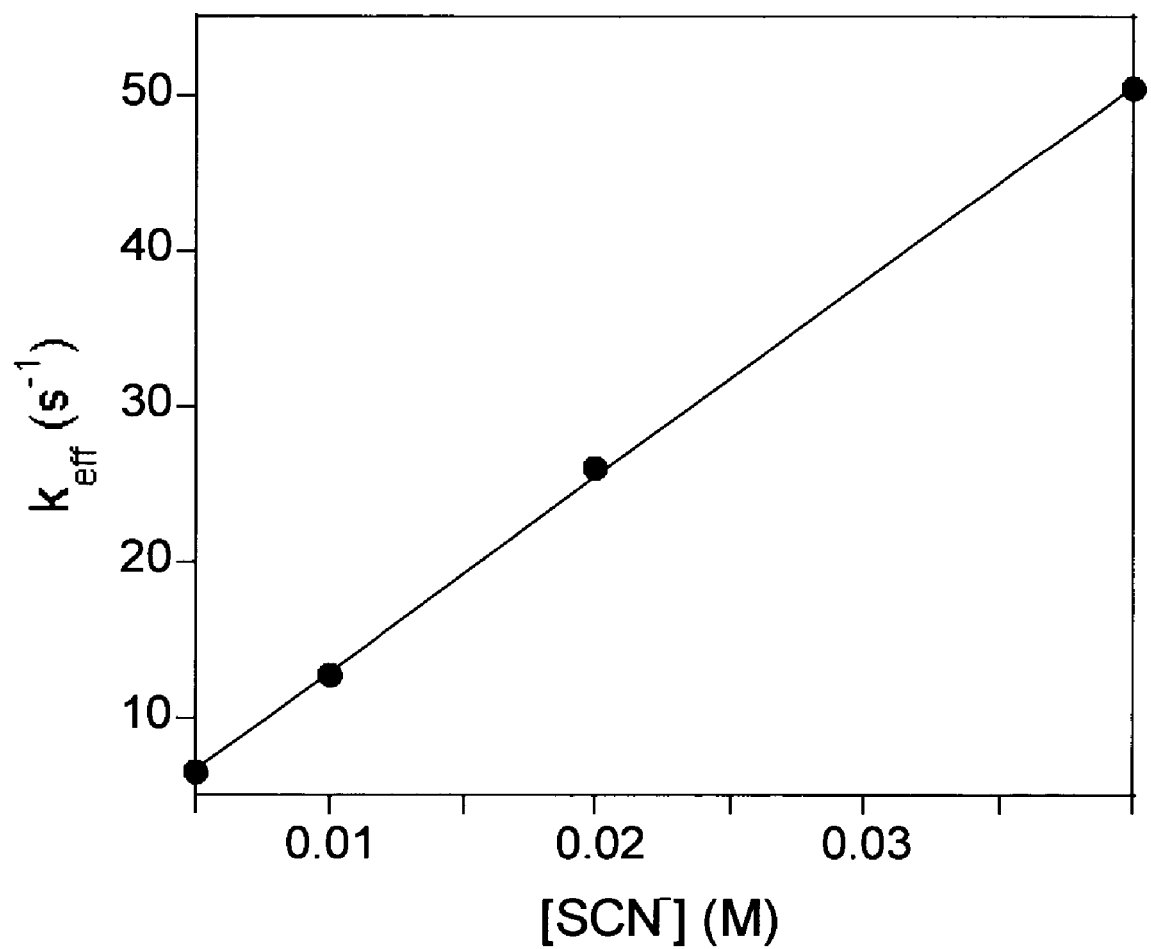
FIG. 3 is a graph of the first-order relationship between $k_{eff}$ and $[SCN^-]$.
Figure 4:
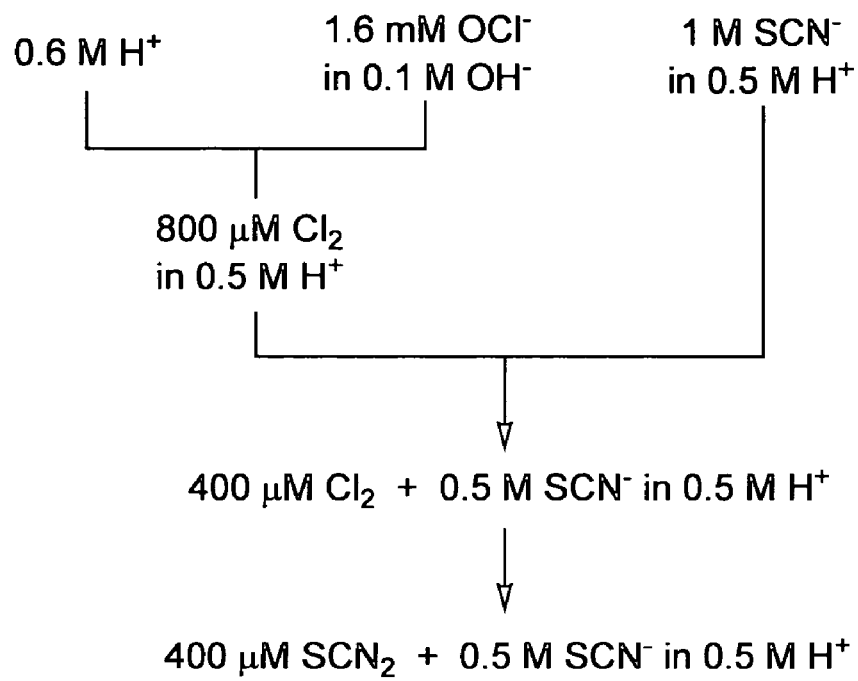
FIG. 4 shows a scheme of double-mixing sequences that produced the spectra of FIG. 5 (top sequence produced the dashed spectrum and bottom sequenced produced the solid spectrum).
Figure 4:
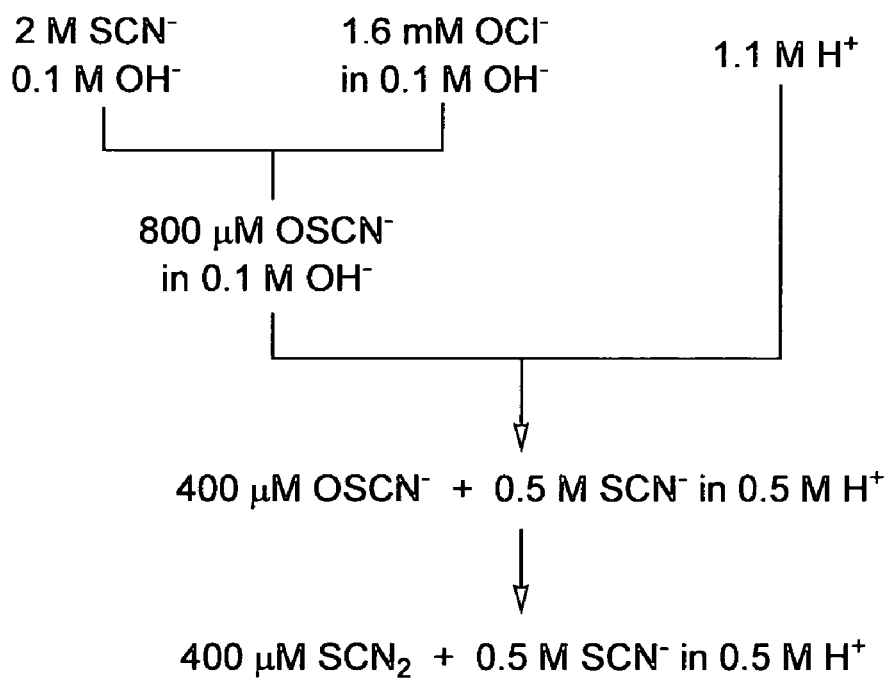

The rate of the reaction of HOCl and $SCN^-$ (eq 2) is too fast at physiologic pH to measure by stopped-flow. However, the equilibrium of eq 1 is driven to $OCl^-$ under basic conditions ($pK_a(HOCl)$=7.4), thus sufficiently slowing reaction 2 to facilitate measurement. Single-mixing stopped-flow reactions of HOCl with excess $SCN^-$ (i.e., pseudo-first-order conditions) yield traces at 300 nm (near $\lambda_{max}$ for $OCl^-$) that fit single-exponential kinetics models between 500 μM<$[OH^-]$ <1.03 M, thus suggesting first-order dependence on $[OCl^-]$ (FIG. 1). The reaction rates were also first-order with respect to $1/[OH^-]_0$ (i.e., first-order with respect to $[H^+]$) over three decades of change in $[OH^-]$ (FIG. 2) and first-order with respect to $[SCN^-]$ (FIG. 3). Production of $OSCN^-$ as the primary oxidation product was indicated by an increase in absorbance at 240 nm and further confirmed by employing a double-mixing stopped-flow sequence to convert the product to $(SCN)_2$ via comproportionation of $OSCN^-$ and $SCN^-$ (FIG. 4). These data are consistent with a facile proton equilibrium to generate HOCl (eq 1), followed by a rate-limiting reaction (eq 2) of HOCl with SCN⁻ to yield OSCN⁻ ($k_3$=2.34(9)×10⁷ M⁻¹S⁻¹). We have also observed hypobromous acid (HOBr) reacts with thiocyanate to yield hypothicyanite (k=5×10⁹ M⁻¹s⁻¹) at the diffusion-controlled limit.

We have determined the stability of hypothiocyanite at neutral pH. (Eqns 3–8, using an arbitrary initial concentration of 1 mM to compare the half-lives of the second-order disproportionation reactions, Eqns 5 and 6):

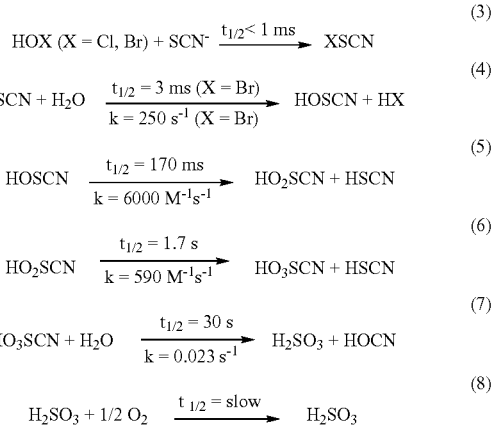

Remarkably, we observe the transitory thiocyanogen bromide (BrSCN, Eqn 3), which subsequently hydrolyzes to yield HOSCN via a pseudo-first-order process that is dependent upon [OH−] (Eqn 4). In the absence of excess HOX or other reactive species (e.g., thiols), HOSCN disproportionates to yield a cascade of transitory derivatives Experimental Procedures General. Reagents were obtained from Sigma-Aldrich and used as received. Water was doubly-distilled in glass. The concentrations of stock solutions of hypochlorite were determined iodometrically. The concentration of hypochlorite in solutions that were prepared from the stock solution were confirmed spectrophometrically ($\epsilon(OCl^-)_{292nm}$=350 M⁻¹cm⁻¹). All manipulations were carried out under atmospheres of prepurified (O₂ and CO₂-free) argon or nitrogen using Schlenk lines or glove boxes. Electronic spectra were measured using a HP 8452A diode array spectrophotometer or the monochromator of a HI-TECH SF-61 DX2 stopped-flow instrument with a Xe arc lamp. Schlenk cuvettes were employed when making measurements with the HP 8452A. The mixing unit of the SF-61 DX2 was located in a Vacuum Atmospheres glove box that is equipped with a MO-40M purifier. Temperature control of the SF-61 DX2 was maintained with a Lauda RC-20 circulator.

Preparation of Base Solutions. Caution: The following procedure is extremely dangerous. The reaction of sodium metal with water, even when the temperature is controlled with liquid nitrogen, is highly exothermic and it proceeds with the evolution of copious amounts of potentially explosive hydrogen gas. This procedure should only be followed by individuals who have considerable experience with Schlenk methods and the handling of such reactions. To avoid contamination with carbonate, a stock base solution was synthesized by reaction of sodium metal with water using Schlenk techniques. Sodium metal was cut from a larger block and successively washed with methanol (to remove oxide), ether, and pentane. The pieces of sodium were added to a three-neck round-bottom flask fitted with a reflux condenser and a Schlenk adaptor under an atmosphere of prepurified argon. Xylene was added and sodium sand was prepared by rapidly mechanically stirring a molten suspension of sodium metal in refluxing xylene. The stirring was stopped, and after cooling to room temperature, the xylene was removed with a cannula, the sand was washed with pentane, and it was dried under vacuum. Carbonate-free solutions of NaOH were prepared by adding sodium sand to distilled water that was freeze-pumped-thawed in a Schlenk flask twice and left under an atmosphere of argon. The reaction was controlled with a liquid nitrogen bath. Since pH electrodes are subject to significant alkaline error at pH greater than 11, hydroxide ion concentration was established by titration with acid. The Schlenk flask was transferred to a glovebox under an atmosphere of nitrogen and three aliquots (diluted 10:1 using volumetric pipettes) were titrated with primary standard potassium hydrogen phthalate (KHP) using phenolphthalene as an indicator. Because the temperature in the glovebox was 36° C. and the pipettes and burette were calibrated at 20° C., the titration was repeated outside the glovebox using solutions that were prepared in the glovebox. Exactly the same result was obtained (no doubt due to compensating effects on both the pipettes and the burette that was used). Using 25 mL volumetric pipettes, a gradient of [OH−] was prepared by successive 1:1 dilutions with 1 M NaCl in water that had been freeze-pumped-thawed three times before transferring to the glovebox. Thus a OH− gradient from ca. 0.0005 to 1 M was prepared with μ=1.

Figure 5:
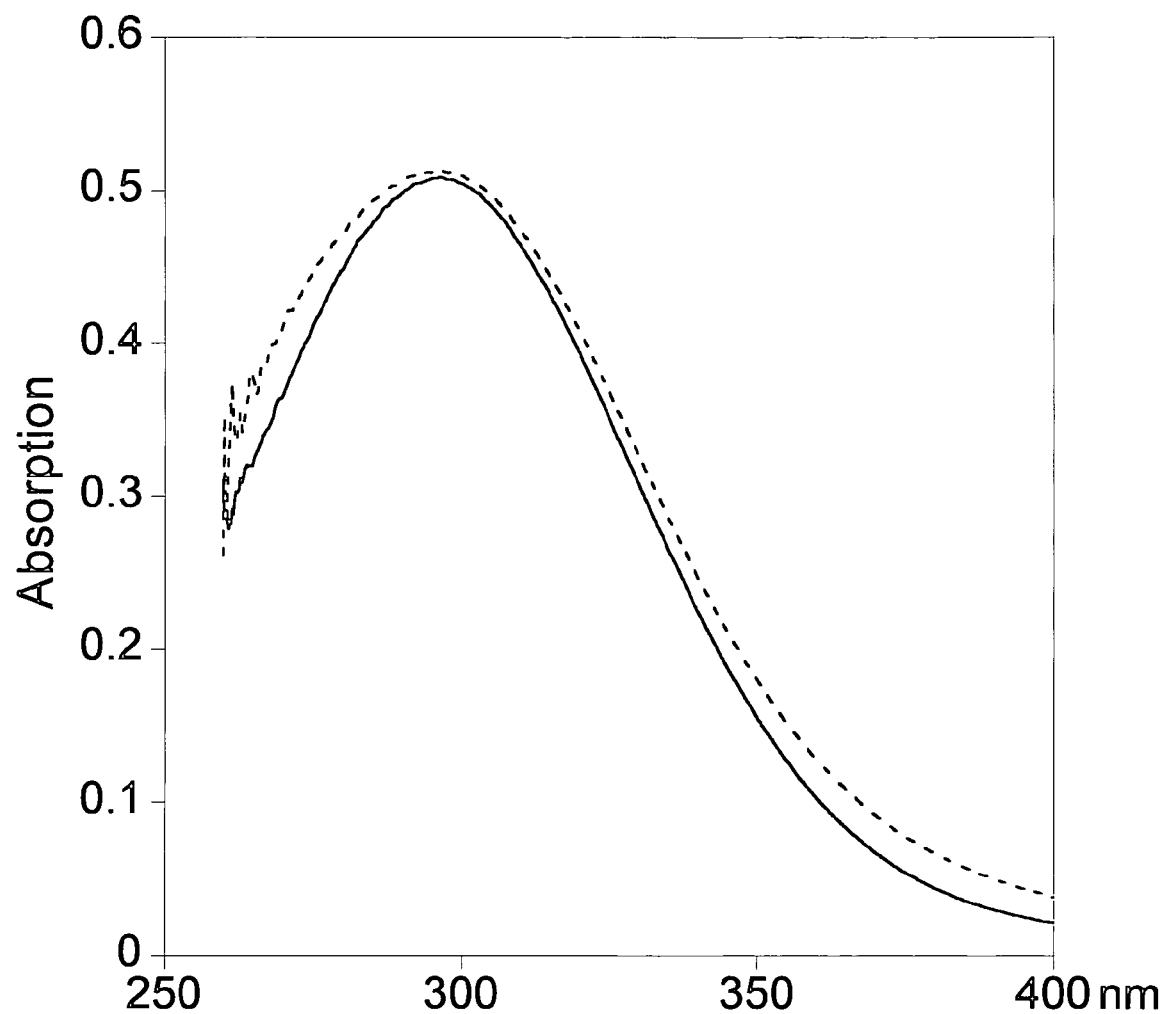
FIG. 5 shows a UV spectrum of $(SCN)_3^-$ (ca. 100 μM, ε=7500 $m^{-1}cm^{-1}$) and $(SCN)_2$ (ca. 300 μM, ε=75 $m^{-1}cm^{-1}$) produced by oxidation of 500 mM $SCN^-$ by 400 μM $Cl_2$ (dashed line) and UV spectrum produced by acidification of 400 μM $OSCN^-$ (solid line) under the same final conditions.

Single-mixing stopped-flow measurements. The data that are summarized in FIGS. 1 and 5 were collected in single-mixing mode. The observed rate constants are summarized in Tables 1 and 2. An example of a typical trace at 300 nm that reflects the first-order disappearance of OCl⁻ is illustrated in FIG. 1. FIG. 1 and the data of Table 1 demonstrate a first-order dependence on [H⁺] (inverse dependence on [OH−]). FIG. 3 and the data in Table 2 demonstrate a first-order dependence on [SCN−]. HOX and thiocyanate are preferably mixed under conditions of turbulent mixing, e.g., with a deadtime (mixing time) of about 1 ms. Thiocyanate is provided in excess (mole:mole) over the HOX.

TABLE 1

Measure Hydroxide Concentrations,[a] Computed Proton Concentrations,[b] Measured Pseudo-First Order Rate Constants, and Computed Second-Order Rate Constants (M⁻¹s⁻¹)[c] for Oxidation of Thiocyanate (10 mM) by Hypochlorite (100 μM) at 25° C.[d]

| [OH−] | [H⁺] | $k_{eff}$ (s⁻¹) | $k_2$ (M⁻¹s⁻¹) × 10⁻⁷ |
|---|---|---|---|
| 5.04 × 10⁻⁴ | 3.22 × 10⁻¹¹ | 195(1) | 2.411 |
| 1.01 × 10⁻³ | 1.61 × 10⁻¹¹ | 98.9(2) | 2.446 |
| 2.01 × 10⁻³ | 8.05 × 10⁻¹² | 48.5(2) | 2.399 |
| 4.03 × 10⁻³ | 4.03 × 10⁻¹² | 25.2(1) | 2.489 |
| 8.06 × 10⁻³ | 2.01 × 10⁻¹² | 11.98(2) | 2.373 |
| 1.61 × 10⁻² | 1.01 × 10⁻¹² | 5.840(8) | 2.302 |
| 3.22 × 10⁻² | 5.03 × 10⁻¹³ | 2.885(3) | 2.283 |
| 6.45 × 10⁻² | 2.52 × 10⁻¹³ | 1.447(1) | 2.286 |
| 1.29 × 10⁻¹ | 1.26 × 10⁻¹³ | 0.7159(7) | 2.262 |
| 2.58 × 10⁻¹ | 6.29 × 10⁻¹⁴ | 0.3672(3) | 2.324 |
| 5.16 × 10⁻¹ | 3.14 × 10⁻¹⁴ | 0.1801(3) | 2.283 |
| 1.03 × 10⁰ | 1.57 × 10⁻¹⁴ | 0.0853(3) | 2.163 |
| | | | $\bar{k}_2$ = 2.34(9) × 10⁷ M⁻¹s⁻¹ |

[a]Measured by titration against KHP and phenolphthaleine.
[b]Assuming $pK_w$ = 13.79 for μ = 1.
[c]See discussion for the kinetic model that was employed.
[d]Ionic strength (μ) constant at 1 with NaCl.

TABLE 2

Measured Pseudo-First Order Rate Constants and Computed Second-Order Rate Constants ($M^{-1}s^{-1}$)[c] for Oxidation of Thiocyanate by Hypochlorite (100 μM) at pH = 11.7.[a]

| SCN⁻ (mM) | T (° C.) | $k_{eff}$ (s⁻¹) | $k_2$ (M⁻¹s⁻¹) × 10⁻⁷ |
|---|---|---|---|
| 5 | 25 | 6.52(1) | 2.641 |
| 10 | 25 | 12.71(3) | 2.574 |
| 20 | 25 | 25.94(7) | 2.627 |
| 40 | 25 | 50.4(2) | 2.552 |
| 10 | 37 | 27.47(8) | — |

[a]Assuming $pK_w$ = 13.79 for μ = 1; ionic strength (μ) constant at 1 with NaCl.

Derivation of rate law. The rate constant $k_3$ can be derived using the steady-state approximation:

$$OCl^- + H^+ \underset{k_a}{\overset{k_{-a}}{\rightleftharpoons}} HOCl$$

$$HOCl + SCN^- \xrightarrow{k_3} Cl^- + OSCN^- + H^+$$

$$\frac{+d[HOCl]}{dt} = k_{-a}[H^+][OCl^-] - k_a[HOCl] - k_3[HOCl][SCN^-] = 0$$

$$= k_{-a}[H^+][OCl^-] - (k_a + k_3[SCN^-])[HOCl]$$

$$[HOCl]_{SS} = \frac{k_{-a}[H^+][OCl^-]}{k_a + k_a[SCN^-]}$$

$$\frac{+d[OSCN^-]}{dt} = k_3[HOCl][SCN^-] = \frac{k_{-a}k_3[H^+][OCl^-][SCN^-]}{k_a + k_2[SCN^-]}$$

Assuming $k_a \gg k_3[SCN^-]$ (i.e., the reaction is first order in $SCN^-$):

$$\frac{+d[OCl^-]}{dt} = k_{eff}[OCl^-] = (k_a k_3 / k_a)[H^+][OCl^-][SCN^-]$$

$$(k_{-a}/k_a) = 1/K_a = 2.51 \times 10^7 M^{-1} \text{(at } \mu = 1)$$

$$k_{eff} = k_3[H^+][SCN^-]/K_a$$

$$k_3 = \frac{K_a k_{eff}}{[H^+][SCN^-]}$$

The same result is obtained if one assumes that HOCl and OCl⁻ are in rapid equilibrium and $K_a \gg [H^+]$, also a valid assumption for the pH range that was employed in this study.

Double-mixing stopped-flow measurements. The rate of reaction of the first mixing and the optimum aging times were independently determined in single-mixing mode. The stabilities of OCl⁻ and SCN⁻ in the pH range of 10–13.5 in the presence of irradiation by the Xe arc lamp were independently established. Although the kinetics were monitored monochromatically, the entire UV spectrum was scanned by the monochromator after the second mixing cycle. The concentrations that were employed in each of the syringes and the sequence of mixing are illustrated in FIG. 4. The HI-TECH SF61 DX2 employs four syringes in double-mixing mode. After 1:1 mixing of the contents of the first two syringes with a deposition of the resulting solution into an aging loop, the contents of that aging loop are driven out of the loop by a third syringe while mixing with the contents of the fourth syringe. Thus, the content of the aging loop is replaced with the content of the third syringe with a 1:1 mixing of the content of the aging syringe and the content of the fourth syringe. We employed 0.1 M NaOH in the third syringe when generating hypothiocyanite in the first mixing cycle and 0.5 M HCl in the third syringe when chlorine was generated in the first mixing cycle. The spectra that were measured for the two double-mixing sequences of FIG. 4 and illustrated in FIG. 5.

Modeling of rate equations. FIG. 2 was generated from data that were computed using rate equations that were programmed into Mathematica 5.0. The simultaneous differential equations were in general solved by numerical methods, although closed solutions were possible in some cases in some cases where the boundary conditions (as defined in the text) simplified the equations. No assumptions were made to simplify the rate laws (e.g., steady-state approximations) except that the Bronsted acid-base chemistry was assumed to be facile with respect to all other kinetic processes and the concentration of Cl⁻ was assumed to remain constant by virtue of its high concentration (100 mM). Dynamic changes in concentration were taken into consideration for all other species:

$$\frac{\partial[MPO]}{\partial t} = -k_1[MPO][H_2O_2] + k_{-1}[MPO-I] + k_2^{Cl^-}[MPO-I][Cl^-]_0 + k_2^{SCN^-}[MPO-I][SCN^-]$$

$$\frac{\partial[MPO-I]}{\partial t} = k_1[MPO][H_2O_2] + k_{-1}[MPO-I] + k_2^{Cl^-}[MPO-I][Cl^-]_0 + k_2^{SCN^-}[MPO-I][SCN^-]$$

$$\frac{\partial[H_2O_2]}{\partial t} = -k_1[MPO][H_2O_2] + k_{-1}[MPO-I]$$

$$\frac{\partial[SCN^-]}{\partial t} = -k_2^{SCN^-}[MPO-I][SCN^-] - \frac{k_3[OCl^-][SCN^-]}{K_a}$$

$$\frac{\partial[OCl^-]}{\partial t} = k_2^{Cl^-}[MPO-I][Cl^-]_0 - \frac{k_3[OCl^-][SCN^-]}{K_a}$$

$$\frac{\partial[OSCN^-]}{\partial t} = k_2^{SCN^-}[MPO-I][SCN^-] + \frac{k_3[OCl^-][SCN^-]}{K_a}$$

Changes may be made in the construction and the operation of the various components, elements and assemblies described herein or in the steps or the sequence of steps of the methods described herein without departing from the spirit and scope of the invention as defined in the following claims.

What is claimed is:

1. A method of synthesizing hypothiocyanite, comprising:
   providing a hypohalous acid;
   providing thiocyanate in excess over the hypohalous acid; and
   combining the hypohalous acid and the thiocyanate under conditions of turbulent mixing to produce a mixture comprising hypothiocyanite.

2. The method of claim 1 wherein the hypohalous acid is hypochlorous acid.

3. The method of claim 1 wherein the hypohalous acid is hypobromous acid.

4. The method of claim 1 carried out at a pH of from about 10 to about 14.

* * * * *